(12) United States Patent
Ye et al.

(10) Patent No.: US 11,368,055 B2
(45) Date of Patent: Jun. 21, 2022

(54) WIRELESS POWER SYSTEM WITH DEBOUNCED CHARGING INDICATOR

(71) Applicant: Apple Inc., Cupertino, CA (US)

(72) Inventors: Daniel Ye, San Francisco, CA (US); Cortland S. Tolva, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 16/452,117

(22) Filed: Jun. 25, 2019

(65) Prior Publication Data

US 2020/0076248 A1 Mar. 5, 2020

Related U.S. Application Data

(60) Provisional application No. 62/725,072, filed on Aug. 30, 2018.

(51) Int. Cl.
*H02J 50/80* (2016.01)
*H02J 7/00* (2006.01)
(Continued)

(52) U.S. Cl.
CPC ............ *H02J 50/80* (2016.02); *H02J 7/0021* (2013.01); *H02J 7/025* (2013.01); *H02J 50/10* (2016.02)

(58) Field of Classification Search
CPC .......... H02J 50/80; H02J 7/0021; H02J 7/025; H02J 50/10
(Continued)

(56) References Cited

U.S. PATENT DOCUMENTS 8,803,364 B2 8/2014 Onishi et al.
9,966,800 B2 5/2018 Lee
(Continued)

FOREIGN PATENT DOCUMENTS

CN 103872721 A 6/2014

OTHER PUBLICATIONS

Chen, Benbin et al., Wireless Charging Monitoring System Based on Bluetooth, 12th International Conference on Computer Science & Education, University of Houston, Aug. 2017, pp. 298-302, Key High-voltage Laboratory of Fujian Province, Xiamen University of Technology, China.

*Primary Examiner* — Metasebia T Retebo
(74) *Attorney, Agent, or Firm* — Treyz Law Group, P.C.; Jason Tsai

(57) ABSTRACT

A wireless power system may have a wireless power transmitting device and a wireless power receiving device. The wireless power receiving device may have a coil that receives wireless power signals from the wireless power transmitting device and may have a rectifier that produces direct-current power from the received wireless power signals. A charging status indicator may be displayed by the wireless power receiving device during wireless power transmission. Control circuitry in the wireless power receiving device may monitor the output voltage to determine whether wireless power transmission has been lost. The charging status indicator may continue to be displayed for a debounce period following detection of loss of wireless power transmission. The debounce period may be adjusted based on whether power loss is due to user movement of the receiving device or termination of power transmission by the transmitting device.

22 Claims, 6 Drawing Sheets

(51) Int. Cl.
*H02J 7/02* (2016.01)
*H02J 50/10* (2016.01)

(58) Field of Classification Search
USPC ......................................................... 307/104
See application file for complete search history.

(56) References Cited

U.S. PATENT DOCUMENTS

| | | |
|---|---|---|
| 2015/0380976 A1* | 12/2015 | Heo ................. H02J 50/80 455/573 |
| 2015/0380979 A1 | 12/2015 | Fukaya |
| 2016/0111892 A1 | 4/2016 | Joehren |
| 2016/0126749 A1 | 5/2016 | Shichino |
| 2017/0025900 A1 | 1/2017 | Amari et al. |
| 2017/0237276 A1 | 8/2017 | Onishi |
| 2018/0138747 A1 | 5/2018 | Mao |
| 2019/0222073 A1* | 7/2019 | Lee ................... H02J 7/025 |

* cited by examiner

WIRELESS POWER SYSTEM WITH DEBOUNCED CHARGING INDICATOR

FIELD

This relates generally to power systems, and, more particularly, to wireless power systems for charging electronic devices.

BACKGROUND

In a wireless charging system, a wireless charging mat wirelessly transmits power to a portable electronic device that is placed on the mat. The portable electronic device has a coil and rectifier circuitry. The coil receives alternating-current wireless power signals from a coil in the wireless charging mat that is overlapped by the coil in the portable electronic device. The rectifier circuitry converts the received signals into direct-current power.

SUMMARY

A wireless power system has a wireless power transmitting device and a wireless power receiving device. The wireless power transmitting device may be a wireless charging mat with a charging surface. The wireless power receiving device has a coil that receives wireless power signals from the wireless power transmitting device when the wireless power receiving device is resting on the charging surface. The wireless power receiving device has a rectifier that produces direct-current power from the received wireless power signals.

The wireless power receiving device may be a portable device with a display or other light-emitting device (e.g., status indicator with one or more light-emitting diodes, etc.). A charging status indicator may be displayed by the wireless power receiving device on the display or other light-emitting device during wireless power transmission. Control circuitry in the wireless power receiving device monitors the output voltage of the rectifier to determine whether wireless power transmission is interrupted. The charging status indicator continues to be displayed for a debounce period following detection of loss of wireless power transmission. This could improve the user's experience by reducing flickering in the displayed charging status indicator due to momentary interruptions in wireless power transmission that may arise either when a user moves the receiving device on the charging surface or when the charging mat momentarily interrupts power transmission to perform coil measurements or other operations.

Long debounce periods help provide sufficient time for control circuitry in the wireless charging mat to conduct coil measurements and other operations that are performed during periods of time in which transmission of wireless power is momentarily halted. Short debounce periods allow the charging status indicator to be removed from the display rapidly following power loss, thereby providing a user with status information that is rapidly updated. To help accommodate both of these desires, the debounce period is adjusted based on whether a detected power loss is due to user movement of the receiving device or termination of power transmission by the transmitting device. The output voltage of the rectifier is evaluated to determine whether power loss (and output voltage drop) is rapid and therefore indicative of a wireless power transmission device depowering even or is slow and therefore indicative of a user removal event.

DETAILED DESCRIPTION

A wireless power system includes a wireless power transmitting device such as a wireless charging mat. The wireless power transmitting device wirelessly transmits power to a wireless power receiving device such as a wristwatch, cellular telephone, tablet computer, laptop computer, or other electronic equipment. The wireless power receiving device uses power from the wireless power transmitting device for powering the device and for charging an internal battery.

The wireless power transmitting device communicates with the wireless power receiving device and obtains information on the characteristics of the wireless power receiving device. The wireless power transmitting device uses information from the wireless power receiving device and measurements made in the wireless power transmitting device to determine which coil or coils in the transmitting device are magnetically coupled to wireless power receiving devices. Coil selection is then performed in the wireless power transmitting device. Wireless power is transmitted from the wireless power transmitting device to the wireless power receiving device using selected coil(s) to charge a battery in the wireless power receiving device and/or to power other load circuitry.

During charging operations, the wireless power receiving device displays a corresponding wireless power charging status indicator (e.g., a green battery icon, text such as "device is currently charging", or other information indicative of the current charging status of the wireless power receiving device). When power is no longer being transmitted, the charging indicator is removed. A debounce arrangement is used by the wireless power system to ensure that the state of the charging indicator is not changed too rapidly, which could create an undesirable flicker in the charge indicator or other undesired output.

Figure 1:
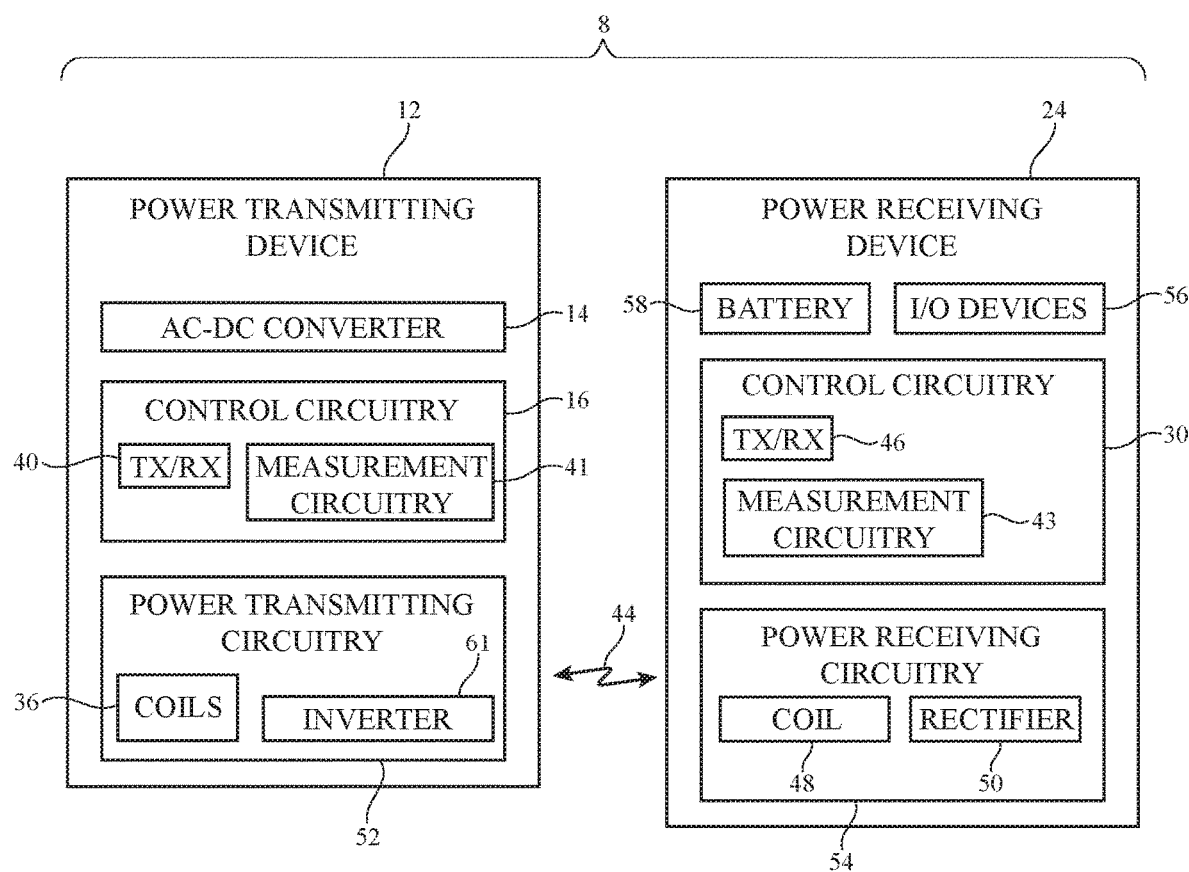
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8.

This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat that includes power adapter circuitry), may be a wireless charging mat that is coupled to a power adapter or other equipment by a cable, may be a portable device, may be equipment that has been incorporated into furniture, a vehicle, or other system, or may be other wireless power transfer equipment. Illustrative configurations in which wireless power transmitting device 12 is a wireless charging mat are sometimes described herein as an example.

Power receiving device 24 may be a portable electronic device such as a wristwatch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as transmit coils 36. Coils 36 may be arranged in a planar coil array (e.g., in configurations in which device 12 is a wireless charging mat).

As the AC currents pass through one or more coils 36, alternating-current electromagnetic (e.g., magnetic) fields (signals 44) are produced that are received by one or more corresponding receiver coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 (sometime referred to as rectifier output voltage Vrect) can be used in charging a battery such as battery 58 and can be used in powering other components in device 24. For example, device 24 may include input-output devices 56 such as a display, touch sensor, communications circuits, audio components, sensors, light-emitting diode status indicators, other light-emitting and light detecting components, and other components and these components may be powered by the DC voltages produced by rectifier 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12.

Wireless transceiver circuitry 40 can use one or more coils 36 to transmit in-band signals to wireless transceiver circuitry 46 that are received by wireless transceiver circuitry 46 using coil 48. Any suitable modulation scheme may be used to support in-band communications between device 12 and device 24. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions. Other types of in-band communications may be used, if desired.

During wireless power transmission operations, circuitry 52 supplies AC drive signals to one or more coils 36 at a given power transmission frequency. The power transmission frequency may be, for example, a predetermined frequency of about 125 kHz, at least 80 kHz, at least 100 kHz, less than 500 kHz, less than 300 kHz, or other suitable wireless power frequency. In some configurations, the power transmission frequency may be negotiated in communications between devices 12 and 24. In other configurations, the power transmission frequency may be fixed.

During wireless power transfer operations, while power transmitting circuitry 52 is driving AC signals into one or more of coils 36 to produce signals 44 at the power transmission frequency, wireless transceiver circuitry 40 uses FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 36 and 48 while power is simultaneously being wirelessly conveyed from device 12 to device 24 using coils 36 and 48.

In-band communications between device 24 and device 12 uses ASK modulation and demodulation techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 36. Wireless transceiver circuitry 40 monitors the amplitude of the AC signal passing through coil(s) 36 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 36 while power is simultaneously being wirelessly conveyed from device 12 to device 24 using coils 36 and 48.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24. During object detection and characterization operations, external object measurement circuitry 41 can be used to make measurements on coils 36 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, switching circuitry in device 12 may be adjusted by control circuitry 16 to switch each of coils 36 into use. As each coil 36 is selectively switched into use, control circuitry 16 uses the signal generator circuitry of signal measurement circuitry 41 to apply a probe signal to that coil while using the signal detection circuitry of signal measurement circuitry 41 to measure a corresponding response. Measurement circuitry 43 in control circuitry 30 and/or in control circuitry 16 may also be used in making current and voltage measurements.

The characteristics of each coil 36 depend on whether any foreign objects overlap that coil (e.g., coins, wireless power receiving devices, etc.) and also depend on whether a wireless power receiving device with a coil such as coil 48 of FIG. 1 is present, which could increase the measured inductance of any overlapped coil 36. Signal measurement circuitry 41 is configured to apply signals to the coil and measure corresponding signal responses. For example, signal measurement circuitry 41 may apply an alternating-current probe signal while monitoring a resulting signal at a node coupled to the coil. As another example, signal measurement circuitry 41 may apply a pulse to the coil and measure a resulting impulse response (e.g., to measure coil inductance). Using measurements from measurement circuitry 41, the wireless power transmitting device can determine whether an external object is present on the coils. If, for example, all of coils 36 exhibit their expected nominal response to the applied signals, control circuitry 16 can conclude that no external devices are present. If one of coils 36 exhibits a different response (e.g., a response varying from a normal no-objects-present baseline), control circuitry 16 can conclude that an external object (potentially a compatible wireless power receiving device) is present.

Control circuitry 30 has measurement circuitry 43. In an illustrative arrangement, measurement circuitry 43 of control circuitry 30 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, device 24 may use measurement circuitry 43 to make measurements to characterize device 24 and the components of device 24. For example, device 24 may use measurement circuitry 43 to measure the inductance of coil 48 (e.g., signal measurement circuitry 43 may be configured to measure signals at coil 48 while supplying coil 48 with signals at one or more frequencies (to measure coil inductances), signal pulses (e.g., so that impulse response measurement circuitry in the measurement circuitry can be used to make inductance and Q factor measurements), etc. Measurement circuitry 43 may also make measurements of the output voltage of rectifier 50, the output current of rectifier 50, etc.

Figure 2:
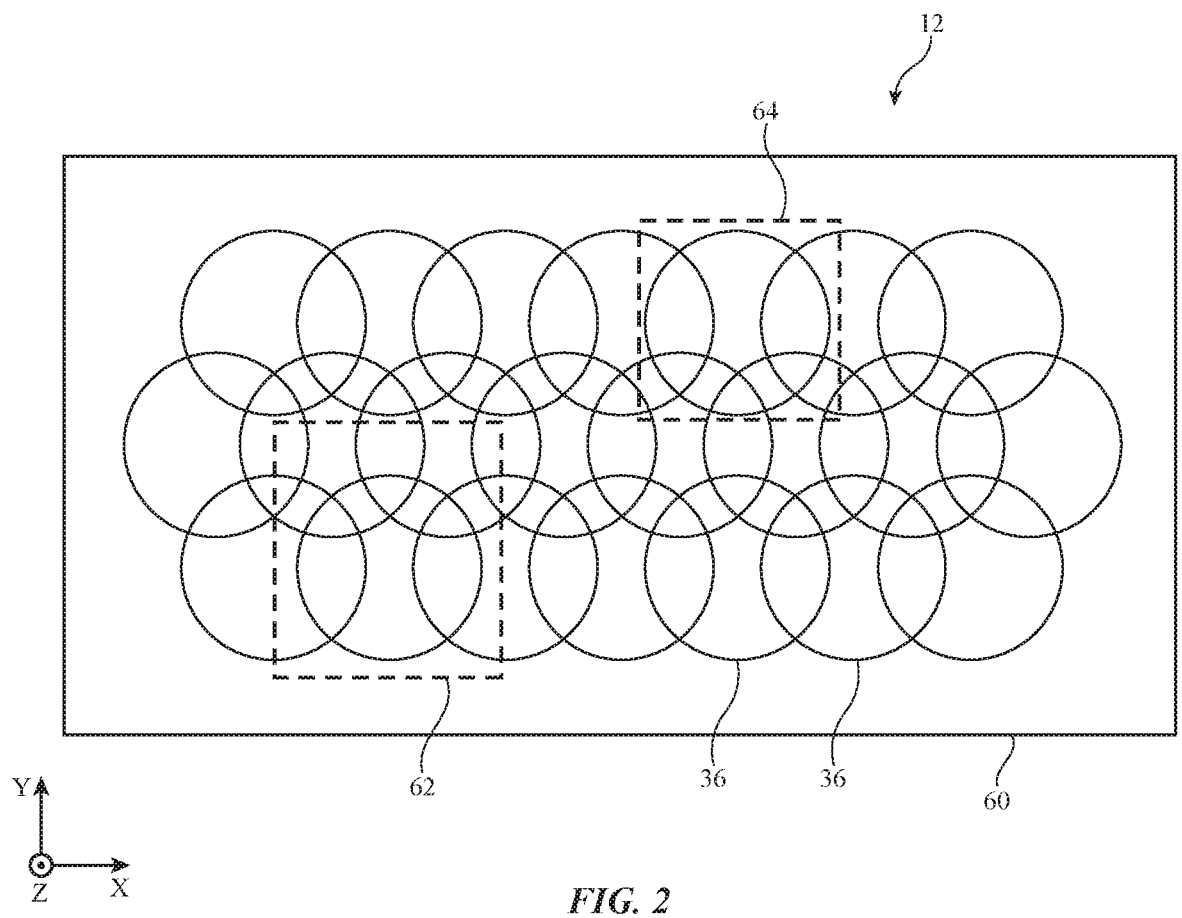
FIG. 2 is a top view of an illustrative wireless power transmitting device having a charging surface in accordance with an embodiment.

A top view of an illustrative configuration for device 12 in which device 12 has an array of coils 36 is shown in FIG. 2. Device 12 may, in general, have any suitable number of coils 36 (e.g., 22 coils, at least 5 coils, at least 10 coils, at least 15 coils, fewer than 30 coils, fewer than 50 coils, etc.). In the example of FIG. 2, device 12 has an array of coils 36 that lie in the X-Y plane. Coils 36 of device 12 are covered by a planar dielectric structure such as a plastic member or other structure forming charging surface 60. The lateral dimensions (X and Y dimensions) of the array of coils 36 in device 12 may be 1-1000 cm, 5-50 cm, more than 5 cm, more than 20 cm, less than 200 cm, less than 75 cm, or other suitable size. Coils 36 may overlap or may be arranged in a non-overlapping configuration. Coils 36 can be placed in a rectangular array having rows and columns and/or may be tiled using a hexagonal tile pattern or other pattern.

During operation, a user places one or more devices 10 on charging surface 60 (see, e.g., illustrative external objects 62 and 64). Foreign objects such as coils, paper clips, scraps of metal foil, and/or other foreign conductive objects may be accidentally placed on surface 60. System 8 automatically detects whether conductive objects located on surface 60 correspond to wireless power receiving devices such as device 24 of FIG. 1 or incompatible foreign objects and takes suitable action (e.g., by transmitting wireless power to devices 24 and blocking power transmission to incompatible foreign objects).

Figure 3:
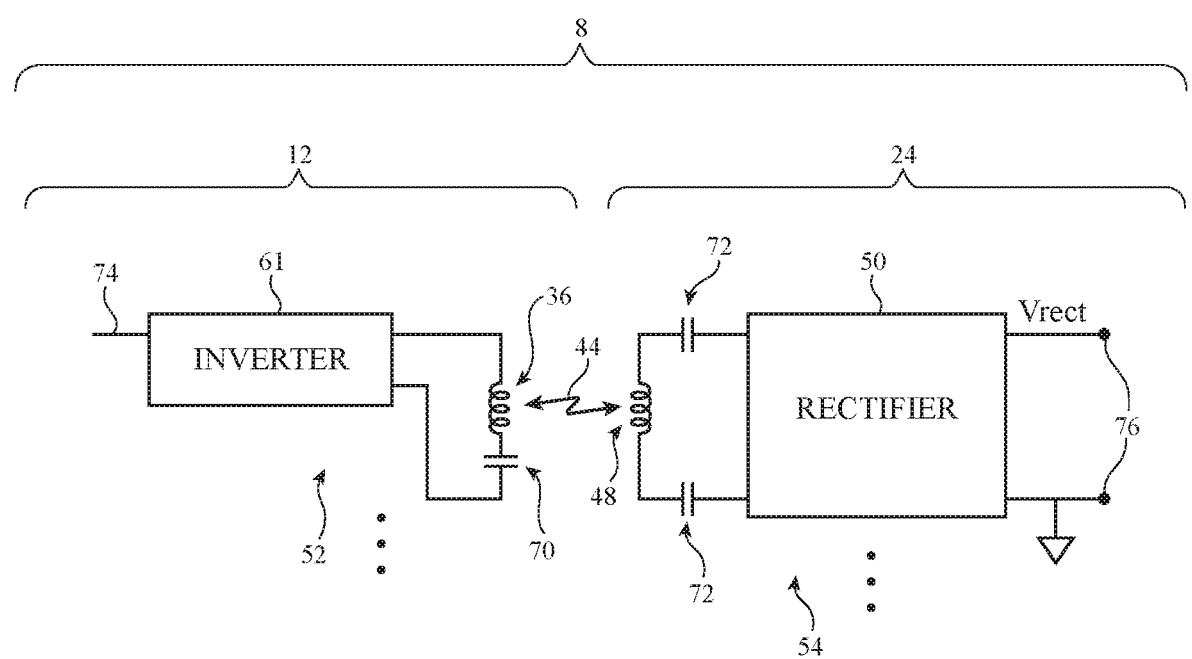
FIG. 3 is a circuit diagram of illustrative wireless power transmitting circuitry and illustrative wireless power receiving circuitry in accordance with an embodiment.

FIG. 3 is a circuit diagram of illustrative wireless charging circuitry for system 8. As shown in FIG. 3, circuitry 52 may include an inverter such as inverter 61 or other drive circuit that produces wireless power signals that are transmitted through an output circuit that includes one or more coils 36 and capacitors such as capacitor 70. Control signals for inverter 61 are provided by control circuitry 16 at control input 74. A single coil 36 is shown in the example of FIG. 3, but multiple coils 36 may be used, if desired. During wireless power transmission operations, transistors in inverter 61 are driven by AC control signals from control circuitry 16. This causes the output circuit formed from coil 36 and capacitor 70 to produce alternating-current electromagnetic fields (signals 44) that are received by wireless power receiving circuitry 54 using a wireless power receiving circuit formed from coil 48 and one or more capacitors 72 in device 24. Rectifier 50 converts received power from AC to DC and supplies a corresponding direct current output voltage Vrect across output terminals 76 for powering load circuitry in device 24 (e.g., for charging battery 58, etc.).

Figure 4:
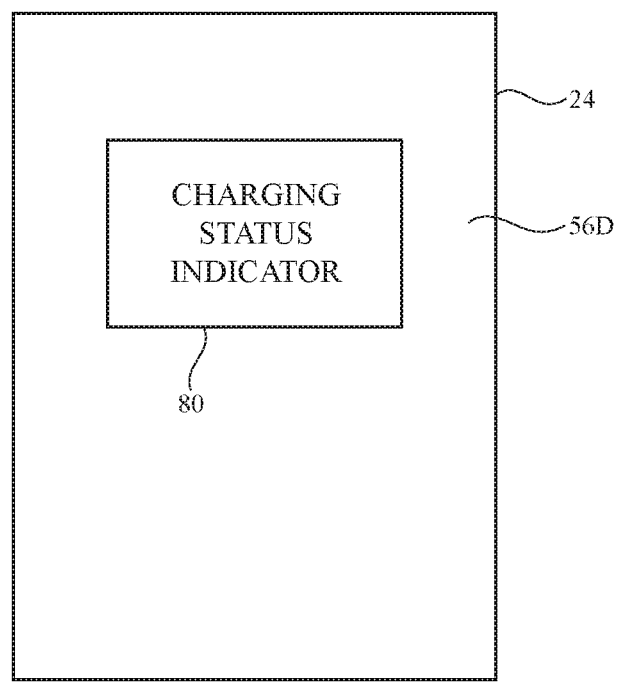
FIG. 4 is a front view of an illustrative wireless power receiving device in accordance with an embodiment.

To inform the user of system 8 of the status of battery charging operations, device 24 uses an output device (e.g., a light-emitting device) such as display 56D of FIG. 4 and/or other charge status output device (e.g., a light-emitting diode status indicator) to display charging status information. For example, in response to detecting that wireless power is being received from device 12, control circuitry 30 of device 24 may use a display in input-output devices 56 such as display 56D of FIG. 4 to display an icon, text, or other information that serves to inform the user of the current charging status of device 24. As shown in the example of FIG. 4, this information may include a charging status indicator such as charging status indicator 80 (e.g., a green battery icon, text that informs the user that charging operations are underway, and/or other information indicating that the wireless charging operations of system 8 are active).

A status indicator debounce scheme is used by device 24 to avoid undesired flickering of the charging status indicator. During charging operations, wireless power transfer may, from time-to-time, be briefly interrupted. For example, a user may move device 24 out of wireless transmission range of charging surface 60 or device 12 may temporarily pause wireless power transfer to device 24 to allow device 12 to perform measurement operations with measurement circuitry 41 (e.g., measurements on coils 36 that are not overlapped by device 24) and/or to allow device 12 to perform other operations while wireless signals 44 are interrupted briefly (e.g., for a fraction of a second to a few seconds or other suitable wireless power transfer interruption period). If status indicator 80 is removed during each pause in wireless power transmission, indicator 80 can flicker, which may confuse the user and lead the user to erroneously believe that charging operations are not proceeding normally. With the debounce scheme, removal of status indicator 80 is inhibited for a debounce period (e.g., a period of about 1.5 to 3 seconds, at least 1 second, less than 5 seconds, or other suitable time period), thereby preventing undesired flickering in indicator 80.

A long debounce period (e.g., 3 seconds) may be desirable to ensure that device 12 has sufficient time to perform measurements with circuitry 41 and/or other operations while wireless power transmission is momentarily paused. Shorter debounce periods (e.g., 1.5 seconds) may be desirable to ensure that a user is not presented with a lingering charging status indicator on display 56D after device 24 is removed from charging surface 60. To accommodate these different desires, system 8 may detect whether a temporary power transmission pause is due to an intentional break in wireless power transmission from the operations of control circuitry 16 (e.g., a pause made by control circuitry 16 to allow sufficient time for control circuitry 16 to perform non-power-transmission operations such as measurements with measurement circuitry 41) or whether the temporary pause is due to removal of device 24 from charging surface 60 by a user. The debounce period used by device 24 can then be automatically adjusted based on the detected cause of the loss in wireless power.

Figure 5:
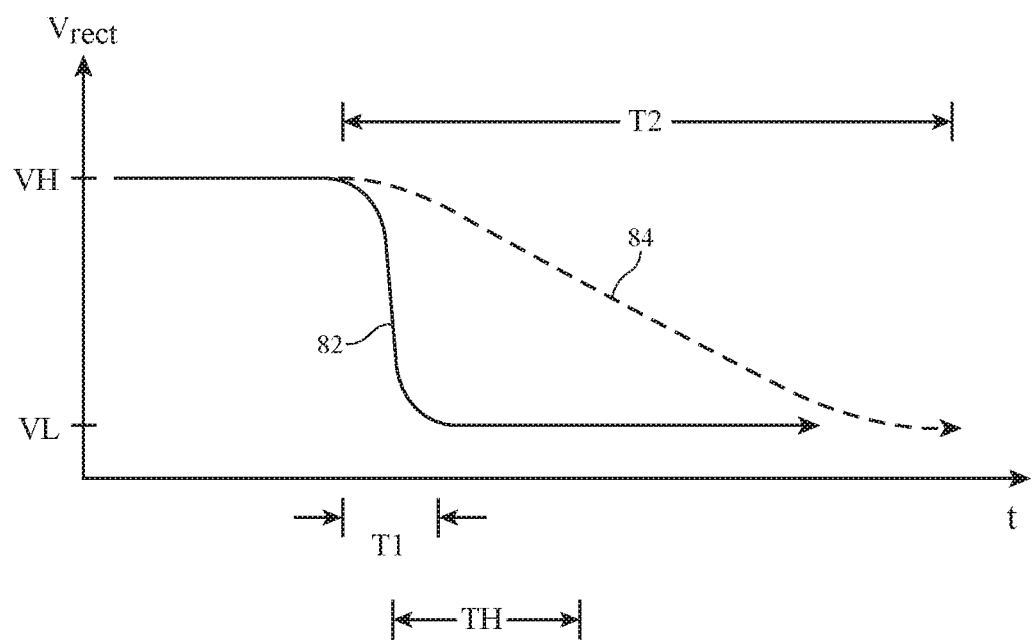
FIG. 5 is a graph of rectifier output voltage under two different illustrative operating scenarios in accordance with an embodiment.

Control 30 may use any suitable circuitry in device 24 to determine whether a loss of received power is due to a halt in power transmission by device 12 or a user removal event. With one illustrative arrangement, control circuitry 30 monitors output voltage Vrect of rectifier 50 as a function of time and determines the speed with which Vrect drops in the event that power transmission is interrupted. A graph of Vrect as a function of time under two different power loss scenarios is shown in FIG. 5. During normal operation, Vrect is high at voltage VH. When power transfer is halted, Vrect falls to a low (e.g., zero) voltage such as VL. As shown by curve 82 in FIG. 5, when power is interrupted by device 12, Vrect drops rapidly over a time period T1. When power is interrupted due to removal of device 24 from the vicinity of device 24 by the user, the process of moving device 24 from charging surface 60 tends to take more time and Vrect drops less rapidly over a longer time period T2. The value of T1 may be, for example, 2-4 ms, at least 1 ms, at least 2 ms, less than 4 ms, less than 15 ms, or other relatively short period of time. The value of T2 may be, for example, 20-100 ms, at least 15 ms, at least 25 ms, at least 40 ms, at least 60 ms, less than 500 ms, less than 250 m, less than 100 ms, or other relatively long time period (e.g. a time period that is longer than T1). Device 24 can apply a threshold transition time TH that is between T1 and T2 when evaluating whether the drop in Vrect from VH (or other suitable voltage threshold associated with normal operation such as VH-ΔV, where ΔV is 0.2 volts or other suitable small offset value) to VL (or other suitable low voltage associated with the absence of wireless power such as VL+ΔV) is slow (and therefore close to time T2) or fast (and therefore close to time T1). If desired, control circuitry 30 can use other measurements to determine whether a loss of received power is due to a halt in power transmission by device 12 or a user removal event. For example, control circuitry 30 can monitor the speed of transmission of the voltage at coil 48 and of the current at the input to rectifier 50 in addition to or instead of monitoring the speed of transition of Vrect. Control circuitry 30 may, as an example, monitor the peak-to-peak voltage and/or current at coil 48 and/or the input to rectifier 50 and can compare the speed of transition of these signal(s) between first (higher) and second (lower) thresholds to a transition threshold setting(s), thereby determining whether a loss of received power is due to an abrupt halt in transmission or a slower user removal scenario.

Figure 6:
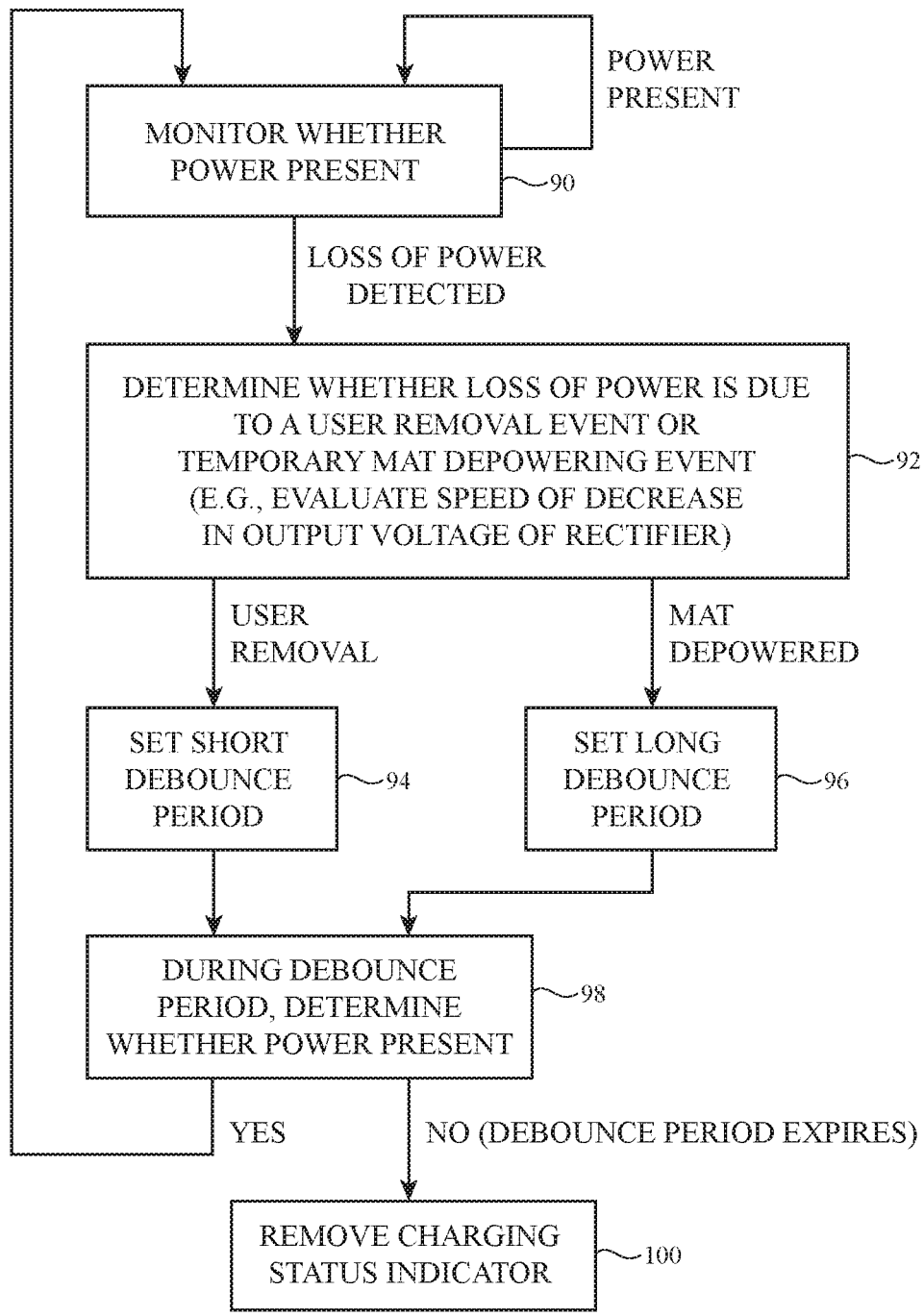
FIG. 6 is a flow chart of illustrative operations involved in operating wireless power transmitting and receiving devices in accordance with an embodiment.

FIG. 6 is a flow chart of illustrative operations in operating system 8. After a user places device 24 on surface 60, control circuitry 16 of device 12 uses power transmitting circuitry 52 to transmit wireless power and power receiving device 24 receives the transmitted wireless power with power receiving circuitry 54. The output voltage Vrect from rectifier 50 is VH during wireless power transmission so that battery 58 is charged (if battery 58 is depleted) and so that the other circuitry of device 24 can be powered. As described in connection with FIG. 4, control circuitry 30 uses display 56D (or other charge status output device in input-output devices 56) to display charging indicator 80 for the user. This informs the user that the process of transferring wireless power from device 12 to device 24 (e.g., to charge battery 58) is active.

During the operations of block 90, while charging indicator 80 is being displayed, device 24 uses control circuitry 30 to monitor Vrect. If Vrect stays at its normal operating level VH, monitoring operations may continue at block 90.

If, however, wireless power transmission is interrupted and Vrect drops, control circuitry 30 may, during the operations of block 92, determine whether the loss of wireless power and accompanying change in Vrect is due to a halt in transmission by device 12 or a user removal event. Control circuitry 30 may, for example, measure Vrect as a function of time to determine the speed with which Vrect drops from a high value (e.g., a value at or near VH) to a low value (e.g., a value at or near VL). The time period T (and therefore the speed) associated with any detected transition in Vrect from high to low voltage can be compared to threshold time period TH to determine whether T is less than TH and therefore associated with a wireless power transfer device depowering event where device 12 momentarily ceases power transmission or is greater than TH and is therefore associated with a user removal event where the user has removed device 24 from charging surface 60 or other portion of device 12 and/or the speed of any detected transition in Vrect can be determined by calculating voltage versus time slope data (dVrect/dt), which can then be compared to a threshold slope value.

Control circuitry 30 can adjust the debounce period (e.g., to first or second values) depending on the speed of the detected transition. As a default and/or in response to determining that the detected loss of power is not due to user removal, device 24 can set the debounce period to a second debounce period value (e.g., 3 seconds or other suitable time period that is longer than a first debounce period) during the operations of block 96. In response to determining that the detected loss of power is due to user removal of device 24 (e.g., movement of device 24 out of wireless power reception range by a user), device 24 can set the debounce period to a shortened first debounce period value (e.g., 1.5 seconds or other suitable time period shorter than the second debounce period) during the operations of block 94.

During the debounce period (block 98), control circuitry 30 continues to display status indicator 80 on display 56D (e.g., status indicator 80 is not removed from display 56D, even though a power loss was detected during the operations of block 90). This prevents undesired flickering in status indicator 80 in the event that power is received intermittently. Control circuitry 30 of power receiving device 24 monitors voltage Vrect at the output of rectifier 50 during the operations of block 98 to determine whether power has been restored. If power transmission is resumed (continuously or even briefly in the event that power transmission device 12 issues a brief keep-alive pulse to ensure that status indicator 80 remains displayed), the charging status indicator continues to be displayed and further operations are performed at block 90. If power transmission is not resumed during block 98 and the debounce period expires, control circuitry 30 removes status indicator 80 from display 56D during the operations of block 100.

If desired, control circuitry 30 can forgo use of the short debounce period in response to determining that loss of power is due to user removal. In this type of arrangement, control circuitry 30 may set a debounce period of 3 seconds or other suitable length during the operations of block 96 in response to determining that loss of power is due to mat depowering and may, during the operations of block 94, forgo setting of the debounce period (e.g., control circuitry 30 may effectively set a zero debounce period) in response to determining that loss of power is due to user removal. When this technique is used, control circuitry 30 maintains the display of the charging status indicator 80 for the debounce period set in block 96 following determination at block 92 that loss of wireless power transmission is due to a wireless power transmitting device depowering event and forgoes maintaining display of the charging status indicator for that debounce period following determination at block 92 that the loss of wireless power transmission is due to a user removal event.

The foregoing is merely illustrative and various modifications can be made to the described embodiments. The foregoing embodiments may be implemented individually or in any combination.

What is claimed is:

1. A wireless power receiving device configured to wirelessly receive power during wireless power transmission from a wireless power transmitting device, comprising:
   wireless power receiving circuitry including a coil and rectifier that is configured to receive wireless power signals with the coil and that is configured to supply a corresponding output voltage;
   control circuitry configured to:
      monitor the output voltage to determine when the wireless power transmission is present; and
      in response to determining that the wireless power transmission has been lost, distinguish between whether the loss of wireless power transmission is (1) due to a user removal event in which the wireless power receiving circuitry is moved away from the wireless power transmitting device and (2) due to a wireless power transmitting device depowering event where the wireless power transmitting device ceases transmission of the wireless power signals.

2. The wireless power receiving device of claim 1 further comprising:
   a battery; and
   a light-emitting device, wherein the control circuitry is configured to display a charging status indicator on the light-emitting device.

3. The wireless power receiving device of claim 2 wherein the control circuitry is configured to:
   maintain display of the charging status indicator on the light-emitting device for a debounce period following determination that loss of wireless power transmission is due to a wireless power transmitting device depowering event; and
   forgo maintaining display of the charging status indicator for the debounce period following determination that the loss of wireless power transmission is due to a user removable event.

4. The wireless power receiving device of claim 2, wherein the control circuitry is configured to display the charging status indicator on the light-emitting device for a selected one of: a first amount of time and a second amount of time, wherein the second amount of time is longer than the first amount of time, and wherein the control circuitry is configured to display the charging status indicator for the second amount of time following determination that the wireless power transmission has been lost and then, in response to determining that the loss of wireless power transmission is due to the wireless power transmitting device depowering event and that wireless power transmission is not present at expiration of the second amount of time, cease displaying the charging status indicator.

5. The wireless power receiving device of claim 4 wherein the control circuitry is configured to display the charging status indicator on the light-emitting device for the first amount of time following determination that the wireless power transmission has been lost and then, in response to determining that the loss of wireless power transmission is due to the user removal event and that wireless power transmission is not present at the expiration of the first amount of time, cease displaying the charging status indicator.

6. The wireless power receiving device of claim 5 wherein the control circuitry is configured to determine whether the loss of wireless power transmission is due to the user removal event or the wireless power transmitting device depowering event by measuring a speed of transition of the output voltage between a first value and a second value that is lower than the first value.

7. The wireless power receiving device of claim 5 wherein the control circuitry is configured to determine whether the loss of wireless power transmission is due to the user removal event or the wireless power transmitting device depowering event by comparing a transition time that corresponds to transition of the output voltage from a first value to a second value that is lower than the first value to a threshold time value.

8. The wireless power receiving device of claim 7 wherein the control circuitry is configured to determine that the loss of wireless power transmission is due to the user removal event in response to determining that the transition time is greater than the threshold time value.

9. The wireless power receiving device of claim 8 wherein the control circuitry is configured to determine that the loss of wireless power transmission is due to the wireless power transmitting device depowering event in response to determining that the transition time is less than the threshold time value.

10. The wireless power receiving device of claim 9 wherein the rectifier is configured to supply the output voltage to the battery to charge the battery when the output voltage is at the first value.

11. The wireless power receiving device of claim 5 wherein the control circuitry is configured to determine whether the loss of wireless power transmission is due to the user removal event or the wireless power transmitting device depowering event by measuring a speed of transition of at least a selected one of: 1) a voltage at the coil and 2) a current at an input of the rectifier.

12. A wireless power receiving device configured to wirelessly receive power during wireless power transmission from a wireless power transmitting device, comprising:
   wireless power receiving circuitry including a coil and a rectifier, wherein the rectifier is configured to receive wireless power signals with the coil and is configured to supply a corresponding output voltage;
   a light-emitting device; and
   control circuitry configured to:
      monitor the output voltage to determine whether the wireless power transmission is present;
      display a charging status indicator on the light-emitting device when the wireless power transmission is determined to be present; and
      in response to determining that the wireless power transmission has been lost, evaluate a transition in the output voltage.

13. The wireless power receiving device of claim 12 wherein the control circuitry is configured to continue to display the charging status indicator on the light-emitting device for a debounce period when the wireless power transmission is lost.

14. The wireless power receiving device of claim 13 wherein the control circuitry is configured to monitor for resumption of the wireless power transmission during the debounce period.

15. The wireless power receiving device of claim 14 wherein the control circuitry is configured to remove the charging status indicator from the light-emitting device upon expiration of the debounce period without detection of resumption of the wireless power transmission during the debounce period.

16. The wireless power receiving device of claim 15 wherein the control circuitry is configured to evaluate the transition in the output voltage to determine whether to assign the debounce period a first value or a second value that is more than the first value.

17. The wireless power receiving device of claim 16 wherein the control circuitry is configured to evaluate the transition in the output voltage to determine whether the loss of wireless power transmission is (1) due to a user removal event in which the wireless power receiving circuitry is moved away from the wireless power transmitting device or (2) due to a wireless power transmitting device depowering event where the wireless power transmitting device ceases transmission of the wireless power signals.

18. The wireless power receiving device of claim 17 wherein the control circuitry is configured to set the debounce period to the first value in response to determining that the loss of wireless power is due to the user removal event.

19. The wireless power receiving device of claim 18 wherein the control circuitry is configured to set the debounce period to the second value in response to determining that the loss of wireless power is due to the wireless power transmitting device depowering event.

20. A wireless power receiving device configured to receive power transmitted wirelessly from a wireless charging mat, comprising:
   wireless power receiving circuitry configured to receive wireless power signals from the wireless charging mat and provide a corresponding output voltage;
   a light-emitting device; and
   control circuitry configured to:
      monitor the output voltage to determine whether the wireless power transmission is present;
      display a charging status indicator on the light-emitting device in response to determining that the wireless power transmission is present; and
      in response to determining that the wireless power transmission has been lost, evaluate the output voltage as a function of time to determine whether the output voltage has dropped from a first value to a second value that is lower than the first value in a first time that is greater than a threshold time and that is indicative of user movement of wireless power receiving circuitry relative to the wireless charging mat or has dropped from the first value to the second value in a second time that is less than the threshold time and that is indicative of halting of wireless power transmission by the wireless charging mat.

21. The wireless power receiving device of claim 20 wherein the control circuitry is configured to continue to display the charging status indicator for a debounce period that is initiated in response to determining that the wireless power transmission has been lost.

22. The wireless power receiving device of claim 21 wherein the control circuitry is configured to adjust the debounce period in response to evaluating the output voltage.

* * * * *